US012811705B2

(12) United States Patent
Zhan et al.

(10) Patent No.: US 12,811,705 B2
(45) Date of Patent: Nov. 24, 2026

(54) CONTROL METHOD FOR REAL-TIME CHANNEL GROUP, NETWORK SYSTEM, AND STORAGE MEDIUM

(71) Applicant: QKM TECHNOLOGY (DONG GUAN) CO., LTD, Dongguan (CN)

(72) Inventors: Xiaoli Zhan, Dongguan (CN); Jinbo Shi, Dongguan (CN); Chi Sha, Dongguan (CN); Lihui Chen, Dongguan (CN); Hong Wang, Dongguan (CN)

(73) Assignee: QKM TECHNOLOGY (DONG GUAN) CO., LTD, Dongguan (CN)

( * ) Notice: Subject to any disclaimer, the term of this patent is extended or adjusted under 35 U.S.C. 154(b) by 327 days.

(21) Appl. No.: 18/721,796

(22) PCT Filed: Dec. 22, 2022

(86) PCT No.: PCT/CN2022/140894
§ 371 (c)(1),
(2) Date: Jun. 19, 2024

(87) PCT Pub. No.: WO2023/116806
PCT Pub. Date: Jun. 29, 2023

(65) Prior Publication Data

US 2025/0088298 A1 Mar. 13, 2025

(30) Foreign Application Priority Data

Dec. 23, 2021 (CN) ......................... 202111588867.X
Dec. 23, 2021 (CN) ......................... 202111588872.0
Dec. 23, 2021 (CN) ......................... 202111589777.2

(51) Int. Cl.
*H04L 67/12* (2022.01)
*H04J 3/06* (2006.01)
*H04L 67/63* (2022.01)

(52) U.S. Cl.
CPC ........... *H04J 3/0658* (2013.01); *H04L 67/12* (2013.01); *H04L 67/63* (2022.05)

(58) Field of Classification Search
CPC ......... H04J 3/0658; H04L 67/12; H04L 67/63
See application file for complete search history.

(56) References Cited

U.S. PATENT DOCUMENTS 4,009,345 A * 2/1977 Flemming .......... H04B 7/18519 370/327
6,975,613 B1 12/2005 Johansson
(Continued)

FOREIGN PATENT DOCUMENTS

CN 106230500 A 12/2016
CN 106953767 A 7/2017
(Continued)

*Primary Examiner* — Fahmida S Chowdhury
(74) *Attorney, Agent, or Firm* — SHIMOKAJI IP

(57) ABSTRACT

A control method for a real-time channel group comprises: after a first real-time channel group creation request is received, joining any node to a first real-time channel group, and initiating system clock synchronization to nodes in the first real-time channel group; after a second real-time channel group creation request is received, joining any node in the first real-time channel group as a shared node to a second real-time channel group; and triggering a channel group packet parsing request according to an execution cycle and an interruption duration to extract a channel group packet for parsing processing. By means of a plurality of real-time channel groups sharing at least one node, system clock synchronization is realized, the number of nodes of real-time channel groups needing to be managed is reduced, and the efficient transmission of a real-time packet is realized.

16 Claims, 6 Drawing Sheets

(56) References Cited

U.S. PATENT DOCUMENTS

| | | | | | |
|---|---|---|---|---|---|
| 2006/0256712 | A1* | 11/2006 | Imajuku | H04J 14/0284 | 370/228 |
| 2008/0151801 | A1* | 6/2008 | Mizuta | H04W 52/46 | 370/311 |
| 2010/0011237 | A1* | 1/2010 | Brooks | G06F 11/362 | 713/502 |
| 2010/0061234 | A1* | 3/2010 | Pai | H04L 47/41 | 370/230.1 |
| 2019/0363760 | A1* | 11/2019 | Wu | H04B 7/0417 | |
| 2020/0037118 | A1* | 1/2020 | DeLanghe | H04L 67/12 | |
| 2023/0131079 | A1* | 4/2023 | Lubeley | G06F 1/06 | 713/401 |

FOREIGN PATENT DOCUMENTS

| | | | | | |
|---|---|---|---|---|---|
| CN | 110572799 | A | | 12/2019 | |
| CN | 110932769 | A | | 3/2020 | |
| CN | 111123806 | A | | 5/2020 | |
| CN | 111448829 | A | | 7/2020 | |
| CN | 114448801 | A | | 5/2022 | |
| CN | 114465689 | A | | 5/2022 | |
| CN | 114466081 | A | | 5/2022 | |
| WO | 2008101394 | A1 | | 8/2008 | |
| WO | WO-2019127523 | A1 | * | 7/2019 | H04N 21/4126 |
| WO | WO-2021129541 | A1 | * | 7/2021 | H04L 63/0876 |

* cited by examiner

CONTROL METHOD FOR REAL-TIME CHANNEL GROUP, NETWORK SYSTEM, AND STORAGE MEDIUM

FIELD OF THE INVENTION

The present application relates to, but is not limited to, the field of communication technology, in particular to a control method, a network system, and a storage medium for a real-time channel group.

BACKGROUND OF THE INVENTION

In the field of communication technology, particularly in industrial Ethernet, real-time channel groups are often created to allow member nodes (such as devices or robot arms) within each group to collaborate and complete a process. In practical applications, multiple real-time channel groups are typically set up to handle multiple processes simultaneously for more efficient industrial control. However, these real-time channel groups are independent from one another, which reduces the control efficiency and increase management costs.

Existing improved ways involve creating a real-time channel group among multiple devices, and sending a control command from the master node in the group to the slave nodes to achieve synchronous processing. However, in actual operation, the synchronization accuracy between the network nodes is low due to the differences in network topology. Additionally, it's difficult to determine the master node for control within nodes of the real-time channel group.

SUMMARY OF THE INVENTION

The embodiments of the present application provide a control method, a network system, and a storage medium for a real-time channel group, thereby improving processing efficiency and reducing management costs for the real-time channel groups.

As on aspect, the embodiments of the present application provide a control method for a real-time channel group, including:

- after a first real-time channel group creation request is received, joining any node in a network domain to a first real-time channel group, and initiating a system clock synchronization to nodes in the first real-time channel group, such that the nodes in the first real-time channel group use a same system clock;
- after a second real-time channel group creation request is received, joining any node in the first real-time channel group as a shared node to a second real-time channel group;
- determining, by the nodes in each real-time channel group, a number of interruptions based on an execution cycle and an interruption duration of each real-time channel group, and triggering a channel group packet parsing request of each real-time channel group based on the number of interruptions corresponding to each real-time channel group, wherein the channel group packet parsing request is configured to extract a channel group packet of the real-time channel group for parsing processing.

Optionally, the method further includes determining a node in the real-time channel group as a master node for dominating a transmission of the channel group packet, and other nodes as slave nodes. The master node is determined by either pre-designating by user or autonomously electing in all nodes in the real-time channel group.

Optionally, for any real-time channel group within the network domain, a node not belonging to the any real-time channel group serve as a transparent transmission node, and the transparent transmission node is configured to transparently transmitting the channel group packet initiated by a member node of the any real-time channel group.

Optionally, a step of autonomously electing the master node includes sending, by each node within the real-time channel group, an election packet to other nodes within the real-time channel group, assessing a transmission efficiency of each node sending the election packet, and determining a node with a highest transmission efficiency as the master node, with other nodes as the slave nodes within the real-time channel group.

Optionally, the transmission efficiency comprises at least one of: a total forwarding count for the election packet reaching other nodes; and a number of the transparent transmission node passed during transmission of the election packet, wherein the transparent transmission node is located within the network domain but beyond the real-time channel group.

Optionally, the method further includes before the election packet is sent by each node within the real-time channel group, determining an election transmission path by performing a shortest path planning for transmitting the election packet based on a routing table, with an originating node of the election transmission path as a source address of the election packet and an terminal node as a destination address.

Optionally, the method further includes receiving, by each node within the real-time channel group, a topology update command, and reinitiating another election packet to other nodes within the real-time channel group to determine a new master node; wherein the topology update command is configured to request a re-election for the master node.

Optionally, the master node of the real-time channel group is configured to process signal commands in the real-time channel group, including:

performing a shortest path planning on several slave nodes by using a routing table of the master node, and obtaining a first transmission path including the several slave nodes;

- determining an terminal node of the first transmission path as a destination address for each signal command, and the master node as a source address of the signal command;
- obtaining a first transmission duration for the signal command to reach the terminal node; and
- determining a first sending time period of the signal command based on an execution cycle of the signal command and the first transmission duration, such that the several slave nodes receive the signal command before an execution interruption within a same execution cycle is generated.

Optionally, said obtaining a first transmission duration for the signal command to reach the terminal node includes:

- obtaining a packet length corresponding to a longest signal command;
- calculating a resident clock cycle consumed on several slave nodes and a hardware transmission delay; and
- calculating the first transmission duration based on the packet length, the resident clock cycles, and the hardware transmission delay.

Optionally, said obtaining a first transmission duration for the signal command to reach the terminal node further includes:

obtaining an inter-frame space between two adjacent signal commands and a first reservation duration; and calculating the first transmission duration based on the packet length, the resident clock cycle, the hardware transmission delay, the inter-frame space, and the first reservation duration.

Optionally, before determining the first sending time period of the signal command, the master node is further configured to obtain a cycle time of generating a unit interrupt, and determine the execution cycle based on a number of interrupts corresponding to the signal command.

Optionally, the master node is located within multiple real-time channel groups, and each of which corresponds to a first sending time period.

Optionally, the method further includes:

obtaining a unit transmission cycle corresponding to the channel group packet with a highest priority in the real-time channel group;

dividing a preset polling cycle into multiple sub-cycles based on the unit transmission cycle; and dividing the multiple sub-cycles based on a bandwidth allocation proportion in bandwidth parameters, to obtain multiple first bandwidths corresponding one-to-one with priorities of the multiple channel group packets, wherein each first bandwidth includes a number of sub-cycles and their respective starting positions.

Optionally, the method further includes:

before scheduling each first bandwidth in each polling cycle, determining whether the first bandwidth is idle; and preemptively occupying the first bandwidth that is idle based on a bandwidth length of the first bandwidth and a priority of a pending channel group packet.

As another aspect, the embodiments of the present application further provide a network system including multiple nodes, each of which is configured to execute the method mentioned above.

As one more aspect, the embodiments of the present application further provide an electronic device including a memory, a processor, and a computer program stored on the memory, wherein the processor executes the computer program to implement the method mentioned above.

As one more aspect, the embodiments of the present application further provide a computer-readable storage medium, on which computer program commands are stored, wherein the computer program instructions are executed by a processor to implement the steps of the method.

As one more aspect, the embodiments of the present application further provide a computer program product or a computer program that includes computer instructions stored in a computer-readable storage medium. A processor of a computer device reads the computer instructions from the computer-readable storage medium, and the processor executes the computer instructions, causing the computer device to implement the methods provided in the various optional embodiments mentioned above under TCP transmission performance control.

In the control method, the network system and the storage medium of the real-time channel group provided in the embodiments of the preset application, system clock synchronization is achieved by sharing one or more nodes in multiple real-time channel groups, thereby reducing the number of member nodes in the real-time channel group that need to be managed, and realizing high efficient transmission of the real-time packets, ultimately improving the processing efficiency and reducing the management cost for the real-time channel groups.

BRIEF DESCRIPTION OF THE DRAWINGS

The following is a brief introduction of the drawings used in the embodiments of the present application, in order to more clearly explain the technical solution in the embodiments of the present application. Obviously, the drawings described below only show some embodiments of the present application. For persons ordinarily skilled in the art, other drawings may also be obtained based on these drawings without any creative work.

DETAILED DESCRIPTION OF ILLUSTRATED EMBODIMENTS

In order to make the purpose, technical solution and advantages of the embodiments of the present application more clear, the technical solution in the embodiments of the present application will be clearly and completely described in combination with the drawings attached to the embodiments of the present application. It should be understood that the specific embodiments described herein are not intended to limit the scope of the present application, but only to interpret the present application.

It should be noted that although the functional modules are divided in the device diagram and the logical sequence is shown in the flowchart, in some cases the steps shown or described can be performed in a different order than the modules in the device or in the flowchart. The terms “first”, “second”, etc. in the specification, claims and drawings above are only used to distinguish similar objects and are not necessarily used to describe a particular order or sequence.

Figure 1:
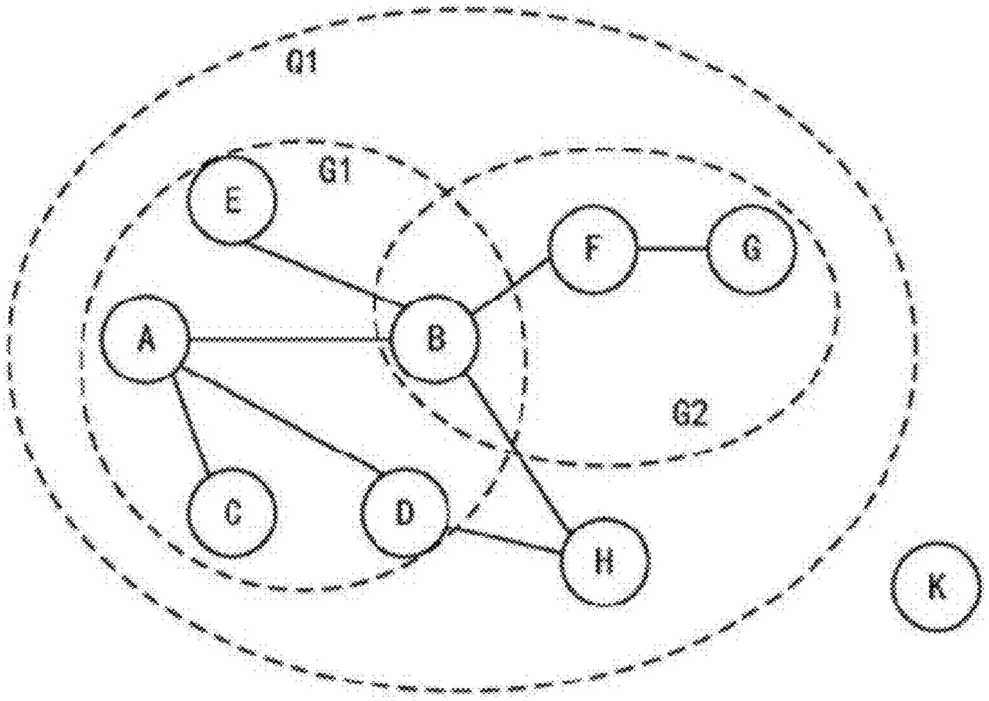
FIG. 1 is a structural schematic diagram of a network system provided in an embodiment of the present application.

Referring to the embodiment shown in FIG. 1, the embodiment of the present application provides a network system including multiple nodes. In response to at least one real-time channel group creation request, each node is joined to at least one real-time channel group and initiate a system clock synchronization to other nodes in each real-time channel group. Specifically, the real-time channel group creation request is configured to request joining a node to a specific real-time channel group.

It should be noted that a control terminal can be additionally configured for dominating the entire network system, independently from the network system, by which administrators can configure member nodes of a real-time channel group and send real-time channel group creation requests to these member nodes. Alternatively, a node within the network system may send the real-time channel group creation requests to various nodes that need to create a real-time channel group. For example, a robot controller may send the real-time channel group creation requests.

As an illustrated example, referring to the embodiment shown in FIG. 1, the network system includes nodes A to K, a total of 9 nodes. Taking node B as an example, once receiving real-time channel group creation requests from the real-time channel groups G1 and G2, node B joins as a shared node in both real-time channel groups G1 and G2. After node B initiates a system clock synchronization to nodes A and F within the real-time channel groups, the system clock synchronization is achieved among all members of groups G1 and G2 (i.e. nodes A to G). Consequently, the interrupt and trigger time of a timer for each member in the real-time channel groups G1 and G2 are synchronized, thereby ensuring the synchronous operations triggered by interrupts within a certain period.

It should be noted that the shared node may be either a master node or a slave node of the real-time channel group. Referring to the embodiment shown in FIG. 1, the shared node B may be the master node of the real-time channel group G1 or G2, or it may be the master node of the real-time channel group G1 and the slave node of the real-time channel group G2, or it may be the slave node of the real-time channel group G1 and the slave node of the real-time channel group G2, or it may be the slave node of the real-time channel group G1 and the master node of the real-time channel group G2. In some embodiments, node B may act as a controller, simultaneously controlling the command processing of the member nodes in the real-time channel groups G1 and G2, thereby improving the node utilization and reducing the management cost for the real-time channel groups. In other embodiments, node B may be a member node of both real-time channel groups G1 and G2, performing first operations under the control of the master node of G1 and G2 respectively, thereby reducing the required amount of nodes for creating the real-time channel groups G1 and G2, ultimately improving the node utilization and reducing the management costs for nodes.

It should be noted that in some embodiments, the real-time channel groups G1 and G2 are located within the same network domain Q1. Taking the master node H of the network domain Q1 as an example, in some embodiments, node H respectively allocates node identifiers to nodes A to G. In some embodiments, each of nodes A to H in the network domain Q1 has routing function. After the network domain Q1 is created successfully, all nodes A to H in the network domain Q1 are actively triggered for updates by node H, thereby ensuring that the packets sent by each node within network domain Q1 are transmitted only within the network domain Q1.

It is understood by those skilled in the art that the topology of the network system shown in FIG. 1 does not limit the embodiments of the present application and may include more or fewer nodes than indicated, or different node topologies.

In conjunction with the accompanying drawings, various embodiments of the control method for a real-time channel group according to the present application are provided, along with further elaboration on the methods of these embodiments.

Figure 2:
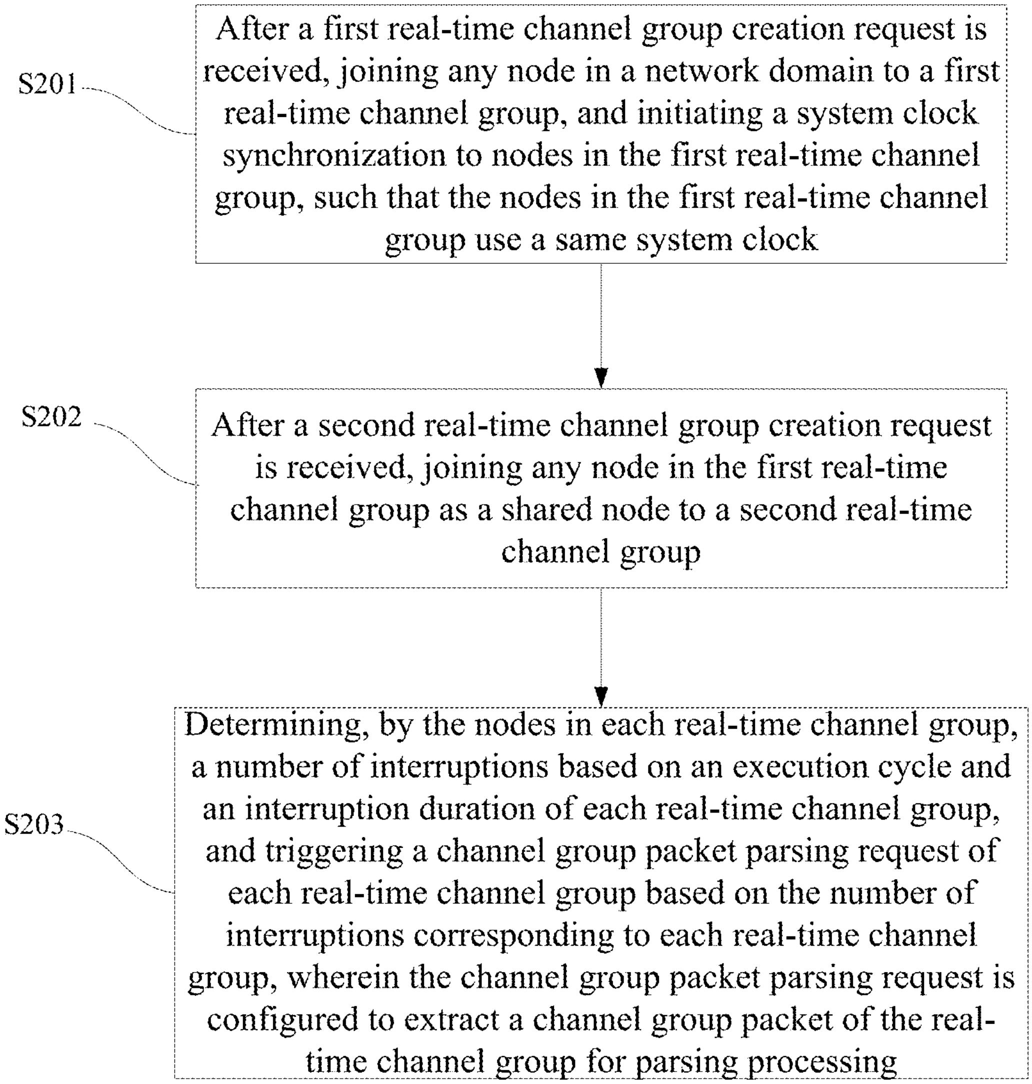
FIG. 2 is a flowchart illustrating a control method for a real-time channel group provided in an embodiment of the present application.

Referring to FIG. 2, a control method for a real-time channel group is provided according to an embodiment of the present application, which includes the following steps:

S201: after a first real-time channel group creation request is received, joining any node in a network domain to a first real-time channel group, and initiating a system clock synchronization to nodes in the first real-time channel group, such that the nodes in the first real-time channel group use a same system clock.

It should be noted that, each node will initiate the system clock synchronization to the nodes within the channel group upon joining the real-time channel group, so that the system clocks of all member nodes in the real-time channel group are synchronized. After the system clock synchronization, each member node within the real-time channel group has the synchronized interrupt trigger time and the synchronized timers, thereby ensuring the timeliness of the real-time packets. For example, in the case of member nodes of a real-time channel group triggering the packet processing via interrupts, as illustrated in FIG. 1, interrupts are simultaneously generated in nodes A to E.

It should be noted that, any node within the network domain may join a created real-time channel group or create a new one.

In some embodiments, if the first real-time channel group has been created before a node receives a first real-time channel group creation request, indicating that the system clock synchronization in the nodes in the first real-time channel group has been completed, a newly joining node can initiate the system clock synchronization to any node in the first real-time channel group to align the system clock with those of the existing nodes.

In some embodiments, if the first real-time channel group is not yet created before a node receives a first real-time channel group creation request, the first real-time channel group should be firstly created, then the system clock synchronization in the nodes within the first real-time channel group can be sequentially initiated by a designated node within the first real-time channel group (such as the master node of the first real-time channel group) or any one node to other nodes, so that the system clocks of all nodes within the first real-time channel group are synchronized.

As an illustrative example, the network domain Q1 includes a master clock node H. When nodes A to E within the real-time channel group in the network domain initiate the system clock synchronization, each system clock for each node in the group will be synchronized with the master clock node H of the network domain Q1 to maintain the clock consistency in all nodes within the real-time channel group.

S202, after a second real-time channel group creation request is received, joining any node in the first real-time channel group as a shared node to a second real-time channel group.

It should be noted that the shared node refers to a node that simultaneously belongs to at least two real-time channel groups. Any node within the real-time channel group may join other real-time channel groups as a shared node.

S203, determining, by the nodes in each real-time channel group, a number of interruptions based on an execution cycle and an interruption duration of each real-time channel group, and triggering a channel group packet parsing request of each real-time channel group based on the number of interruptions corresponding to each real-time channel group, wherein the channel group packet parsing request is configured to extract a channel group packet of the real-time channel group for parsing processing.

In some embodiments, if the second real-time channel group has been created before the shared node joins the second real-time channel group, indicating that the system clock synchronization for the nodes in the second real-time channel group has been completed, the shared node that is newly joined can initiate the system clock synchronization to other nodes in the second real-time channel group. As a result, the respective system clock for each node in the second real-time channel group will be adjusted based on the system clock of the shared node to ensure the same system clock in the nodes in the second and first real-time channel groups.

In some embodiments, if the second real-time channel group is not yet created before the shared node joins the second real-time channel group, it indicates that the system clock synchronization for the nodes in the second real-time channel group is not yet completed. Therefore, after creating the second real-time channel group, the system clock synchronization can be initiated sequentially by a designated node (for example, the master node of the second real-time channel group) or any node within the second real-time channel group, so that the system clocks of all nodes within the second real-time channel group remain consistent.

By this token, by responding to at least one real-time channel group creation request on a node, it is possible for a node to belong to at least one real-time channel group. Consequently, at least one node is shared in multiple real-time channel groups. When any member node of the real-time channel group initiates a request for system clock synchronization, the synchronization of system clocks across multiple real-time channel groups can be achieved through the shared nodes, thereby achieving efficient transmission for real-time packets in each real-time channel group. Compared with the prior art, the present application allows multiple real-time channel groups to share one or more nodes, thereby reducing the number of member nodes that need to be managed within the real-time channel groups, ultimately improving the processing efficiency and reducing the management costs for the real-time channel groups.

It is understood that real-time channel group is created within a network domain, meaning that each member node within the real-time channel group is located in the same network domain and the routing table of each member node is updated by the master node of the network domain.

It should be noted that the network domain is configured to restrict the packet interactions between multiple nodes within the domain. Referring to the embodiment in FIG. 1, the packets initiated by any node within the network domain Q1 can only be transmitted within the network domain Q1. The scope of the network domain, i.e. the nodes contained in the network domain, can be changed by updating the routing table. Without updating the routing table, each node can only address based on the routing table entries, thereby achieving node isolation within the network system.

Understandably, after real-time channel groups are created within a network domain, there may be one or more nodes within the network domain that do not belong to that specific real-time channel group. In such cases, the signal commands within the real-time channel group may be transmitted through the nodes that are not part of that group. In the embodiment, these nodes that are not part of the specific real-time channel group but through which the signal commands pass during transmission are referred to as transparent transmission nodes for that real-time channel group. Such transparent transmission nodes are used to transparently transmitting the channel group packets initiated by the member nodes of the real-time channel group. As an illustrated example, in the embodiment of FIG. 1, a channel group packet is initiated by the real-time channel group G1 which includes nodes A to E. For the real-time channel group G1, nodes F and G in the real-time channel group G2 are considered as transparent transmission nodes, which will receive and transparently transmit the channel group packet. As an illustrated example, in the embodiment of FIG. 1, node H, not part of the real-time channel group G1, is considered as a transparent transmission node for the real-time channel group G1. When the packet from node D in the real-time channel group G1 to node B passes through node H, node H will transparently transmitting the packet through to node B, without any processing.

Figure 3:
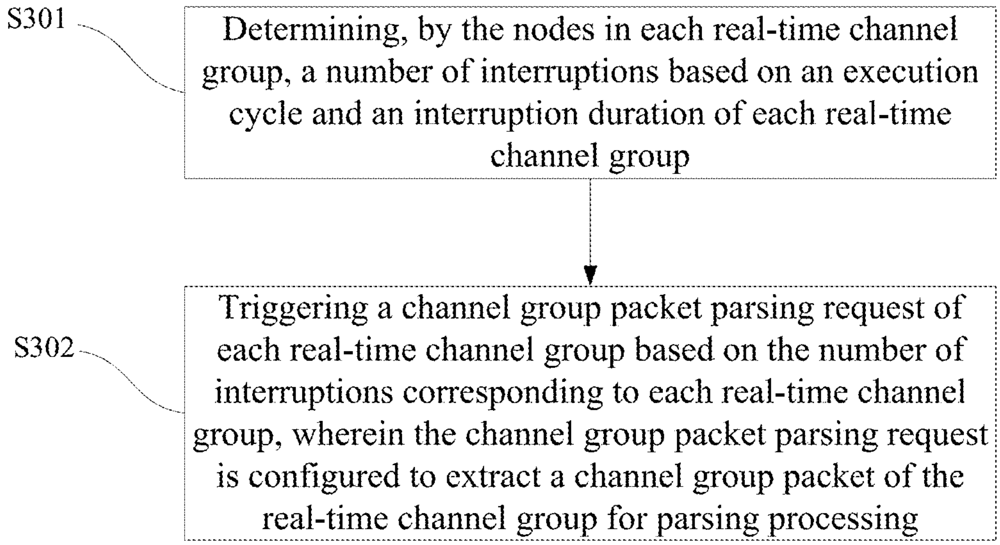
FIG. 3 is a flowchart illustrating the operational triggering process of the real-time channel group provided in an embodiment of the present application.

Understandably, referring to FIG. 3, the method according to the embodiment of the present application further includes:

S301, determining, by the nodes in each real-time channel group, a number of interruptions based on an execution cycle and an interruption duration of each real-time channel group.

It should be noted that different execution cycles may be set for different real-time channel groups. In some embodiments, the interrupt duration is 1 second, and the execution cycle of the real-time channel group G1 is 10 seconds, that means the nodes within the channel group packet of G1 need to execute the channel group packet every 10 seconds, that is, once parsing processing should be performed on the channel group packet once 10 interrupt counts are accumulated. In other embodiments, if the execution cycle of the real-time channel group G2 is 20 seconds, the nodes need to execute the channel group packet in the channel group packet of G2 every 20 seconds, that is, once parsing process should be performed on the channel group packets once 20 interrupt counts are accumulated.

S302, triggering a channel group packet parsing request of each real-time channel group based on the number of interruptions corresponding to each real-time channel group, wherein the channel group packet parsing request is configured to extract a channel group packet of the real-time channel group for parsing processing.

It should be noted that for each node within the real-time channel group, a cache region corresponding to the real-time channel group is created to store the channel group packets, thereby enabling the extraction and the parsing processing of the channel group packets in the execution cycle.

It should be noted that, in cases where multiple real-time channel groups have the same execution cycle, the shared node will sequentially extract and process the channel group packets of the real-time channel groups once the interrupt count is triggered. Referring to the embodiment of FIG. 1, if both real-time channel groups G1 and G2 have an execution cycle of 10 seconds, the shared node B will sequentially extract and process the channel group packets of the real-time channel groups G1 and G2 once desired interrupt count is obtained.

Understandably, the interrupt duration is 1 millisecond.

It should be noted that the method according to the embodiments of the present application further includes: pre-designating a node within the real-time channel group as a master node, while other nodes as slave nodes.

In some embodiments, a control terminal may be configured to issue a node configuration request to the nodes in the real-time channel group. Such a node configuration request includes a node identifier of the master node of the real-time channel group, based on which each node then completes its configuration. In other embodiments, the node configuration request may be sent by a control node predefined in the network domain or the real-time channel group. For example, in the case of robots, a robot controller may issue a node configuration request to the nodes within the real-time channel group.

It should be noted that the master node is responsible for controlling the slave nodes within the same real-time channel group. For example, in the case of robots, a real-time channel group is created by the robot controller and multiple robot arms. In response to the node configuration request from the real-time channel group, the robot controller is determined as the master node, while the robot arms acknowledge the master node and are determined as the slave nodes. In this case, the robot controller may send instructions to control the operations of the robot arms and receive the status sent from the robot arms, thereby effectively controlling each robot arm.

In some embodiments, the master node of the real-time channel group may be elected autonomously by the nodes within the group. The election process of the master node includes: sending, by each node in the real-time channel group, an election packet to other nodes, assessing the transmission efficiency of the packet in each node, and selecting the node with the highest transmission efficiency as the master node, others nodes as the slave nodes.

Figure 4:
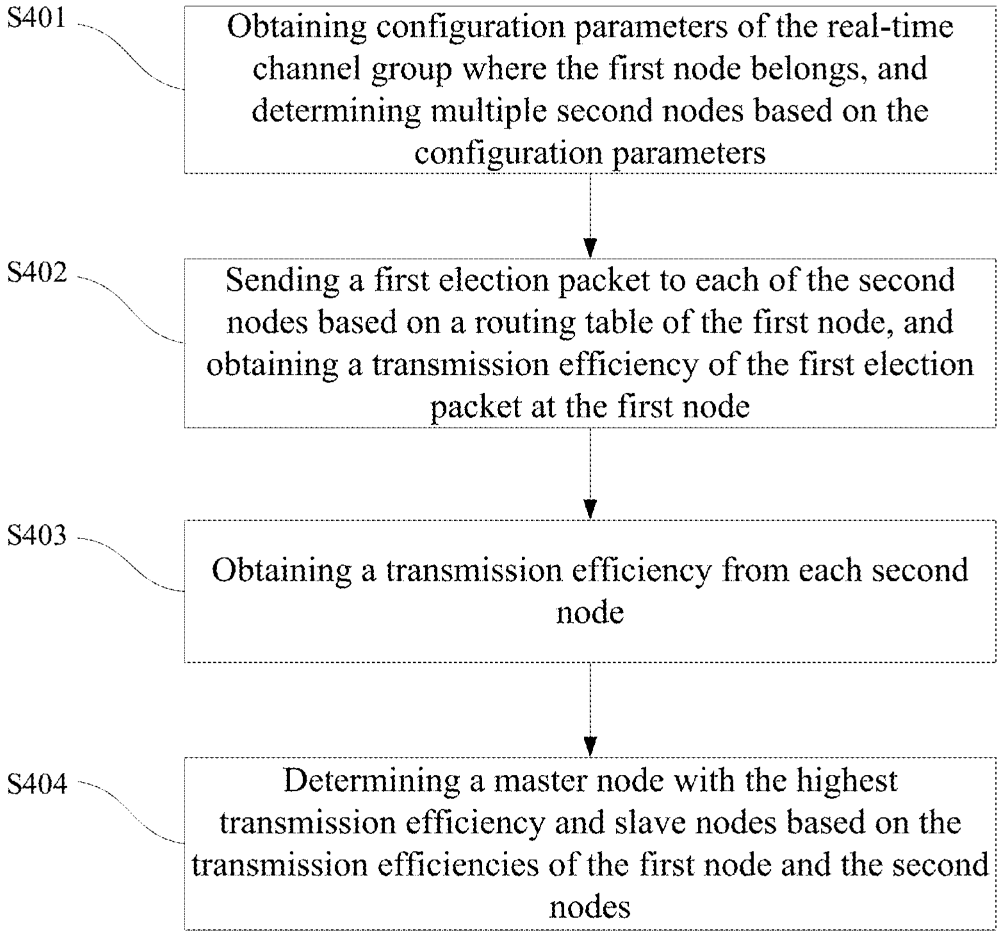
FIG. 4 is a flowchart illustrating the process of electing a master node for the real-time channel group provided in an embodiment of the present application.

Referring to FIG. 4, for example, the first node within the real-time channel group initiates the election process of master node as follows:

S401, obtaining configuration parameters of the real-time channel group where the first node belongs, and determining multiple second nodes based on the configuration parameters. The real-time channel group consists of the first node and the multiple second nodes.

It should be noted that, the configuration parameters of the real-time channel group include related information for each member node.

S402, sending a first election packet to each of the second nodes based on a routing table of the first node, and obtaining a transmission efficiency of the first election packet at the first node.

It should be noted that the routing tables of the first node and the second nodes have the same routing table entry, that is, the destination address set of the routing table entry is the same. The transmission efficiency of the first node is indicated by the time when the first election packet was sent, and the time and the forwarding count when the first election packet reaches the second node.

S403, obtaining a transmission efficiency from each second node.

It should be noted that the transmission efficiency of the second node is determined by sending a second election packet to other nodes in the real-time channel group, that is, by referring to steps S401 to S402. At this time, the second nodes will broadcast their respective transmission efficiency to other member nodes in the real-time channel group. The first node will also broadcast its transmission efficiency to other member nodes of the real-time channel group, so that each member node of the real-time channel group can obtain the transmission efficiencies of all member nodes.

S404, determining a master node with the highest transmission efficiency and slave nodes based on the transmission efficiencies of the first node and the second nodes.

As an illustrated example, referring in FIG. 1, it's assessed that the transmission efficiency of node B is higher than those of nodes A, C, D, and E, thus node B subsequently negotiates to become the master node. Similarly, based on the same transmission efficiency for each of other nodes A, C, D and E, they respectively negotiate to determine node B as the master node, thereby completing the auto-negotiation and determination for the master node in the real-time channel group G1. It should be noted that, when the transmission efficiency is represented by time, the highest transmission efficiency indicates the shortest transmission time; when the transmission efficiency is represented by the forwarding count, the highest transmission efficiency indicates the less forwarding count.

It should be noted that in response to the control of the master node, the slave nodes will execute the control commands sent by the master node, or report the status to the master node periodically, so that the master node may collect the status information of each slave node.

Therefore, based on the transmission efficiencies for each node, the node having the highest transmission efficiency is elected as the master node in the real-time channel group, and other nodes are determined as the slave nodes. In such a way, the production efficiency within the group can be significantly improved. Furthermore, compared with the prior art, the autonomous election for the mater node in the real-time channel group is achieved in the present application, which reduces manual intervention and control thresholds, thereby making the selection of the master node more convenient and universal in the real-time channel groups.

Understandably, the transmission efficiency of the node includes the total forwarding count of the election packet sent by the node to other nodes in the real-time channel group. For example, the transmission efficiency of the first node includes the total forwarding count of the election packet sent by the first node to each second node in the group.

It should be noted that in some embodiments, the total forwarding count is the number of times the packet is forwarded through each second node until it reaches the last second node. In other embodiments, the total forwarding count is the sum of forwarding counts to reach each second node separately.

As an illustrative example, in some embodiments shown in FIG. 1, assuming that the forwarding count from node B to node A is FN1, from node B to node C is FN2, from node D to node C is FN3, and from node B to node E is FN4, then the total forwarding count is FN1+FN2+FN3+FN4. In other embodiments, if the sequence of nodes from the first node to several second nodes is fixed, such as B-E-A-C-D, then the forwarding count when reaching the first node D is considered as the total forwarding count.

Understandably, the transmission efficiency further includes the number of transparent transmission nodes through which the election packet passes during transmission.

It should be noted that election packet may pass through the transparent transmission nodes during transmission, which impacts the transmission rate of the packet in the real-time channel group although that election packet will not processed by the transparent transmission nodes. Therefore, a master node with higher transmission efficiency may be determined upon the election condition which further includes the number of the transparent transmission nodes beyond the real-time channel group passed through.

Understandably, the method according to the embodiment of the present application further includes the following steps: before the election packet is sent by each node within the real-time channel group, and determining an election transmission path by performing a shortest path planning for transmitting the election packet based on a routing table, with an originating node of the election transmission path as a source address of the election packet and an terminal node as a destination address For example, in FIG. 4, during the election process of the master node, the first node carries out the shortest path planning for the second nodes based on the routing table of the first node, to obtain an election transmission path including the first node and the second nodes. The first node is then determined as the source address for the first election packet, and the terminal node of the election transmission path is determined as the destination address.

It should be noted that, for each second node, the determination of the next hop address is based on shortest path planning via routing tables. When the first node establishes the election transmission path using the same rule, the second node receiving the first election packet can match this path with the information of the next hop node in the real-time channel group, thereby simplifying the interactions between the nodes in the group and improving the bandwidth utilization among the nodes.

As an illustrated example, referring to the embodiment in FIG. 1, node B is closest to node E, node E is closest to node A (excluding the last hop node B), and node A is closest to node C, thus the election transmission path is established as B→E→A→C→D. It's seen that the next hop for node B towards the destination node D is node E. Node E forwards the election packet to node A by routing addressing, and the election packet is eventually sent to the destination node D following the election transmission path. During transmission, corresponding forwarding counts and/or time passing each node will be recorded, allowing the destination node D to assess the transmission efficiency of the election transmission path. Similarly, other member nodes in the real-time channel group follow the same procedure.

It should be noted that, the election transmission path is determined based on the shortest distance between adjacent nodes, thus after excluding the last hop address, the next hop address for the destination node matches with the nodes on the election transmission path. It should be noted that after the master node is elected and determined within the real-time channel group, the master node issues control commands based on the planned election transmission path, with the terminal node of this path as the destination address of the control commands.

Understandably, the method according to the embodiments of the present application further includes generating, by each node within the real-time channel group, a first packet based on preset response cycles or event triggered signals, then sending the first packet to the master node of the real-time channel group.

By setting trigger events, the system can respond promptly to an unexpected situation, thereby further improving the overall robustness of the real-time channel group.

It should be noted that, the method according to the embodiments of the present application further includes receiving, by each node in the real-time channel group, a topology update command, and then reinitiating another election packet to other nodes within the real-time channel group to determine a new master node. The topology update command is configured to request a re-election for the master node.

It should be noted that the topology update command may be issued by the control end, automatically triggered after node initialization, or automatically triggered upon networking change. For example, once the master node in the real-time channel group fails offline, the slave nodes in the same real-time channel group detects this and sends a topology update command to other nodes in the real-time channel group.

It should be noted that, the issue of the topology update command signifies changes in the physical network of the real-time channel group, not only including member node offline events within the real-time channel group, but also including changes in physical connection relationships between the member nodes.

It should be noted that, each member node in the real-time channel group is allocated a node identifier, and the routing table for each member records the mapping relationship between this node identifier and its physical address. During application, the node identifier is populated in the destination and source addresses of the packets of the corresponding signal commands. For example, in the election packets, the node identifier of the master node is determined as the source address, and the terminal node on the first transmission path is determined as the destination address.

In some embodiments, after the election for the master node within the real-time channel group is completed, the system clock synchronization for all nodes within the real-time channel group is carried out by the master node.

Figure 5:
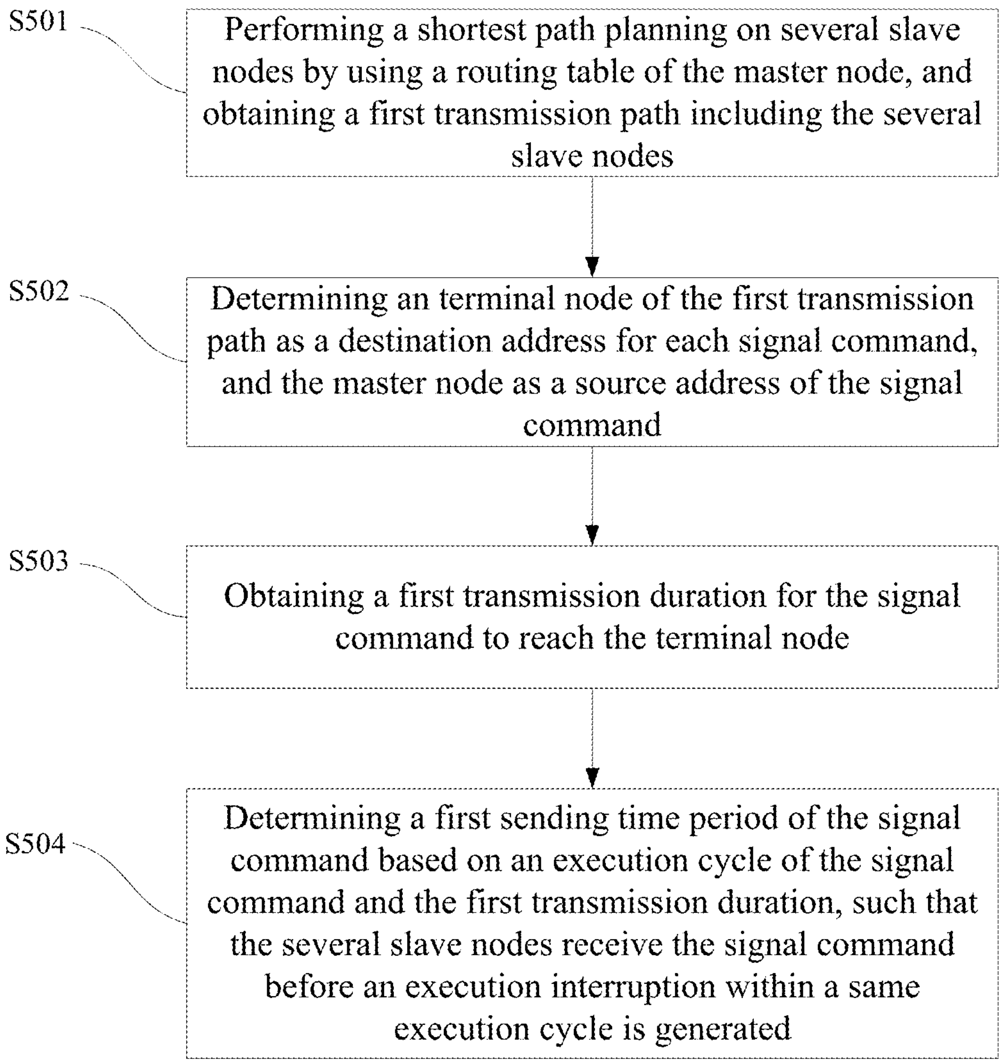
FIG. 5 is a flowchart illustrating the process of the signal command synchronization carried out by the master node of the real-time channel group provided in an embodiment of the present application.

Referring to FIG. 5, the embodiment of the present application further provides a control method for a real-time channel group, specifically applied to the master node within the real-time channel group for processing the signal commands in the group. The method includes the following steps:

S501, performing a shortest path planning on several slave nodes by using a routing table of the master node, and obtaining a first transmission path including the several slave nodes.

It should be noted that, the first transmission path represents the sequence in which the master node passes through each slave node, which is a logical transmission path. For example, in the embodiment shown in FIG. 1, the logical transmission path for the real-time channel group G1 is B→A→C→D→E, while the actual transmission path for the real-time channel group G1 is B→A→C→A→D→A→B→E.

It should be noted that, each member node in the real-time channel group has its own routing table, which includes identical destination address in the routing table entry for each member node. The first transmission path is determined based on the shortest distance between adjacent member nodes. As an illustrated example shown in FIG. 1, if the master node B corresponds to the shortest transmission path with slave node A, then from master node B, the shortest transmission path to the next slave node (node C) is determined, resulting in the final first transmission path of B→A→C→D→E. For each slave node, when the terminal node is the destination address, the next hop is calculated based on the shortest path. Therefore, the next hop for each slave node is matched with the transmission sequence set in the first transmission path.

S502, determining an terminal node of the first transmission path as a destination address for each signal command, and the master node as a source address of the signal command.

S503, obtaining a first transmission duration for the signal command to reach the terminal node.

It should be noted that under unchanged physical topology, the first transmission duration remains relatively fixed, which can be measured or estimated based on the transmission time of the links.

S504, determining a first sending time period of the signal command based on an execution cycle of the signal command and the first transmission duration, such that the several slave nodes receive the signal command before an execution interruption within a same execution cycle is generated.

Figure 6:
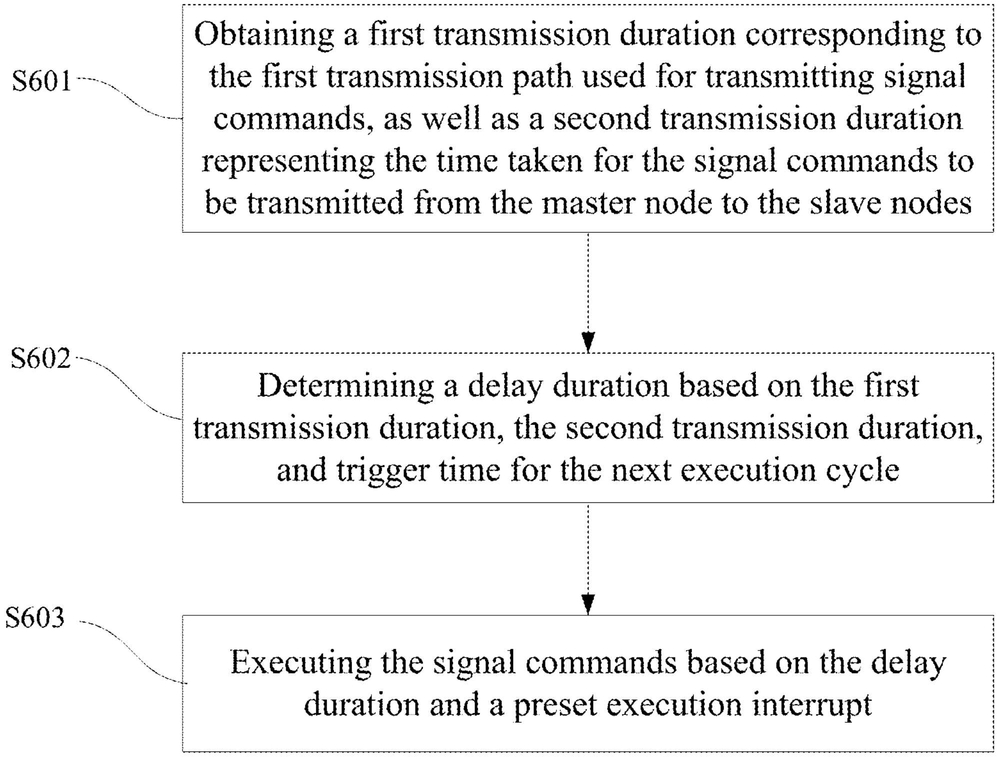
FIG. 6 is a flowchart illustrating the process of the signal command synchronization carried out by the slave node of the real-time channel group provided in an embodiment of the present application.

Accordingly, referring to FIG. 6, the embodiment of the present application further provides a control method for a real-time channel group, specifically applied to the slave nodes within the real-time channel group for processing the signal commands in the group. The method includes the following steps:

- S601, obtaining a first transmission duration corresponding to the first transmission path used for transmitting signal commands, as well as a second transmission duration representing the time taken for the signal commands to be transmitted from the master node to the slave nodes;
- S602, determining a delay duration based on the first transmission duration, the second transmission duration, and trigger time for the next execution cycle;
- S603, executing the signal commands based on the delay duration and a preset execution interrupt.

It should be noted that, the second transmission duration can be calculated similarly to the first transmission duration, either by measurement or saved from the slave node. It should be noted that, the delay duration is set to ensure the execution occurs precisely at the corresponding execution interrupt of the same execution cycle.

It should be noted that the master node and the slave nodes mentioned in steps S501 to S504 and S601 to S603 are located within the same real-time channel group.

It should be noted that, by utilizing execution interrupts to trigger the execution cycles, timing accuracy can be improved. The system clocks of the slave nodes are synchronized and consistent with the master node, so that execution the interrupts occur simultaneously for all slave nodes. Therefore, the synchronization is achieved since the signal commands are received by each slave node before the same execution interrupt occurs.

It should be noted that in some embodiments, the first transmission duration is less than the execution cycle duration. Therefore, it's possible not to set the delay duration for the slave nodes, as each slave node may execute within the closest execution cycle upon receiving the signal commands. Optionally, the delay duration may set for the slave nodes to further specify when to execute the signal commands. In other embodiments, the first transmission duration exceeds the execution cycle duration. In this case, the delay duration may be set for the slave nodes to ensure that each slave node executes within the same execution cycle.

It should be noted that, the signal commands generated in a first sending time period will be sent out to guarantee synchronous execution across all slave nodes. The first sending time period is defined for each execution cycle, and an interval between the ending time of the first sending time period and the ending time of the corresponding execution cycle is equal to a first transmission duration.

Figure 7:
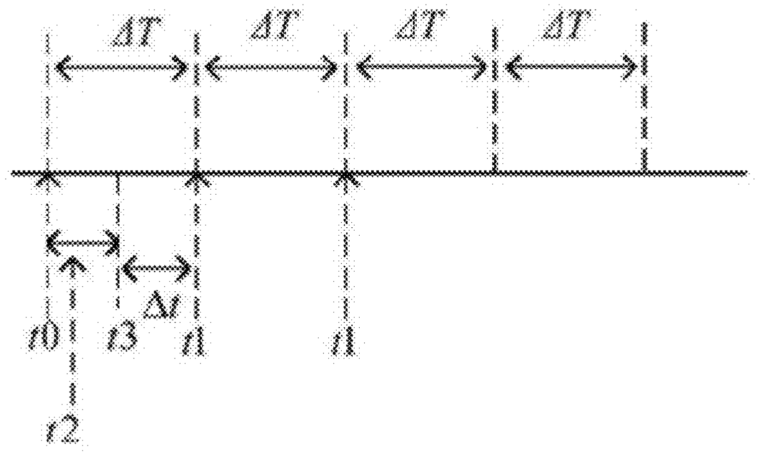
FIG. 7 is a schematic diagram showing the relationship between the sending time and execution cycles in the signal command synchronization of the channel group provided in an embodiment of the present application.

As an illustrated example, referring to the time list shown in FIG. 7, with an execution cycle of ΔT and a start time of an actual execution cycle of t1. The range of the first sending time period for the master node is from to to t3, with the signal command sent at t2. Here, the interval between t3 and t1 is equal to the first transmission duration Δt. Consequently, each slave node can receive the signal command before t1, and when the slave nodes encounter the corresponding execution interrupt at t1, each slave node executes the signal command simultaneously.

Therefore, after the system clock synchronization is carried out in the master and slave nodes, both system time and clocks of the master node and each slave node are synchronized, and the execution interrupts of multiple nodes are also synchronized. Under the unchanged physical topology in the real-time channel group, the first sending time period is determined based on the first transmission duration and the execution cycle, so that multiple slave nodes may trigger the execution of signal commands simultaneously. Thus, the first sending time period ensures that the signal command is received before the same execution interrupt occurs. Furthermore, the system clock synchronization reduces the time differences between the execution interrupts among the slave nodes, thereby improving synchronization precision among multiple slave nodes.

Exemplarily, although the specific content of the signal commands does not need to be specified, examples of the signal commands may include data output from the master node to the slave nodes, requests from the master node for status reports from the slave nodes, or a combination of both. If the signal commands involve outputting data from the master node to the slave nodes, the master node aims to insert the data into the data frame about to be sent, and then send out in the first sending time period to arrive at the cache region for each slave node. In such a way, each slave node in the real-time channel group may read the respective data when the execution interrupt occurs simultaneously.

Understandably, the step S503 includes obtaining a packet length corresponding to a longest signal command; calculating a resident clock cycle consumed on several slave nodes and a hardware transmission delay; and calculating the first transmission duration based on the packet length, the resident clock cycles, and the hardware transmission delay.

Exemplarily, assuming the packet length corresponding to the longest signal command is 1518 bytes, a resident clock cycle is 2 (namely 2 bytes of transmission time is added), and a hardware transmission delay is Δt1. Taking Gigabit Ethernet transmission speed as an example (where each bit transmission time is 1 nanosecond and each byte transmission time is thus 8 nanoseconds), the first transmission duration Δt=(1518+2)*8 ns+Δt1.

Understandably, the step S503 further includes obtaining an inter-frame space between two adjacent signal commands and a preset first reservation duration. Correspondingly, the first transmission duration may be calculated based on the packet length, the resident clock cycle, the hardware transmission delay, the inter-frame space, and first reservation duration.

Exemplarily, assuming the packet length corresponding to the longest signal command is 1518 bytes, the resident clock cycle is 2, the hardware transmission delay is Δt1, the inter-frame space is 12 bytes, and the first reservation duration is Δt2, then the first transmission duration Δt=(1518+2+12+Δt2)*8 ns+Δt1.

It should be noted that the first reservation duration represents a compatible duration, thus reducing the probability of decreased synchronization precision due to errors in the first transmission duration. In some embodiments, the first reservation duration includes the preparation time during signal command encapsulation.

Understandably, the step S502 includes determining the node identifier corresponding to the master node as the source address of the signal command and determining the node identifier corresponding to the terminal node as the destination address for each signal command.

It should be noted that replacing the physical address information of the nodes with the node identifiers can shorten the packet length corresponding to the signal commands, simplify the parsing and matching process, and increase the efficiency of the packet processing.

It should be noted that in some embodiments, the routing table entries are sorted by the numerical value of the destination addresses. With node identifiers as indexes, once the physical address information of the destination address is determined, the next hop address can be quickly determined through binary search.

Understandably, the method according to the embodiment of the present application further includes obtaining the cycle time when a unit interrupt occurs and determining the execution cycle based on the number of interrupts corresponding to the signal commands.

It should be note that, by accumulating the unit interrupts to calculate the execution cycle, the number of the interrupts required can be reduced, thereby improving the precision of the execution cycle and further increasing the probability of synchronization among each slave node. At this time, the execution interrupt is the unit interrupt that counts until the interrupt count is met.

Understandably, the master node is located within multiple real-time channel groups, where the first sending time period corresponds one-to-one with each of the real-time channel groups.

It should be noted that, multiple real-time channel groups may be differentiated based on the difference in the execution cycles. The real-time channel groups with the same execution cycle may be executed within the same polling cycle.

Understandably, the maximum number of the signal commands allowed to be transmitted within the polling cycle may be calculated and displayed.

The polling period refers to a period corresponding to the sub-bandwidth of parsing the signal commands. The display of the maximum number of the signal commands is served as a prompt for users, thereby reducing the risk of an excessive number of the signal commands from the main network node within a certain period, which could lead to delays in processing.

It should be noted that in some embodiments, the network domain creation is achieved by routing and addressing in multiple activated nodes within a preset time period. Specifically, several nodes within the network system may be selected as activated nodes by physical isolation (such as powering up the nodes to join the network domain and powering down the nodes beyond the network domain), or by setting activation identifiers. Once the network domain is created, the master node of the network domain triggers the update on the routing table, thereby ensuring the stability of the network domain. Referring to the embodiment shown in FIG. 1, after the routing and address in nodes A to G within a preset time period, the network domain Q1 will no longer update the routing tables. At this time, nodes A to G each receive a routing table containing the physical address information for all nodes A to G. After the automatic updates on the routing tables cease, nodes A to G are unaware of other nodes, thus creating the network domain Q1.

Understandably, the master node of the network domain is responsible for assigning a node identifier to each member node within the domain and monitoring the online status of each member node based on these node identifiers.

It should be noted that, once node identifiers are assigned, the source and destination addresses in the packet transmissions within the real-time channel group G1 may be replaced by the node identifiers, thereby reducing the number of bytes occupied by the source and destination addresses.

It should be noted that, by monitoring the online status of the nodes in real time, updates on the routing tables of the network domain can be triggered, thereby ensuring normal communication between other member nodes if a non-critical node fails.

It should be noted that in some embodiments, the master node of the network domain is automatically elected after the network domain is formed. Referring to the embodiment shown in FIG. 1, once the network domain Q1 is formed, nodes A to H each send the election packets. At this time, the update time for the routing table for each node is known to each member node, thus that node with the most recent update time is elected as the master node H in the network domain Q1.

In some embodiments, the mater node is configured to exclude the failure nodes from the network domain, and accept the nodes outside the network domain to join and assign node identifiers to these nodes to be joined.

It should be noted that, the initialization of the network domain is diffused from the master node to adjacent slave nodes, which then propagate to all nodes through a process of traversing uninitialized adjacent nodes. For example, the master node H of the network domain Q1 sends initialization information to nodes B and D. Nodes B and D then locate their adjacent nodes (E and A respectively) through routing and send initialization requests to them, continuing this process until all nodes are initialized. The initialization of the network domain includes the allocation of node identifiers. In other embodiments, initialization also involves synchronizing the routing table of the master node with the slave nodes of the network domain.

Understandably, the method according to the embodiment of the present application further includes determining the transmission sequence based on the predefined distances between any two member nodes within the real-time channel group in the routing table.

It should be noted that each member node in the real-time channel group has a routing table, and each routing table entry in the routing table of each member node contains the same destination address. Addressing between any two member nodes is done through the routing table. It should be noted that, the node located at the initiation of the transmission sequence is the master node. After the transmission sequence is determined, the terminal node in the transmission sequence is served as the destination address. In such a way, the channel group packets initiated by the master node pass sequentially through each slave node according to the transmission sequence. As an illustrated example, referring to the embodiment shown in FIG. 1, assuming node D is the master node and the determined transmission sequence is A, B, C, E. After sent from node D, the channel group packet passes through nodes A, B, and C in sequence by routing and addressing, and finally reaches node E. Therefore, nodes A, B, and C may extract relevant operational commands from the channel group packet, thereby enabling node D to send the command signals to each slave node through a single channel group packet.

It should be noted that once the transmission sequence is determined by the master node, the transmission sequence is saved in the channel group packet, which allows each slave node to address routing based on the transmission sequence in the channel group packet. In some embodiments, the transmission sequence may be determined by each slave node based on the determination method of the master node, so that the next hop node can be determined in consistency with the transmission sequence, when the destination address is consistent. It should be noted that, the transmission sequence only needs to be computed and saved once under an unchanged physical topology.

Understandably, each routing table entry includes a destination address, a next hop address, a network interface, and a forwarding count. The routing table entries are sorted based on the numerical values of the destination addresses.

It should be noted that, the specific arrangement for the destination addresses in numerical value order allows binary search in the routing table, thus enhancing the lookup efficiency. For example, the routing table entries are arranged in descending order based on the numerical values of the destination addresses.

Understandably, the method according to the embodiment of the present application further includes performing a bandwidth allocation based on bandwidth parameters.

It should be noted that, the bandwidth parameters define the transmission bandwidth for the channel group packets having different priorities within a polling cycle and their transmission starting time.

It should be noted that, the real-time channel group packets may include event-triggered and periodic channel group packets, wherein the event-triggered channel group packets have higher priority and stringent timeliness requirements. Therefore, the real-time transmission of the channel group packets can be ensured due to the bandwidth parameters.

It should be noted that, the bandwidth parameters may be set by the master node of the real-time channel group or by each member node independently. By setting the bandwidth parameters at the master node, the bandwidth allocation among the member nodes can be consistent, thereby further ensuring the real-time transmission of the channel group packets. Additionally, the bandwidth allocation may be managed by the master node of the real-time channel group.

Figure 8:
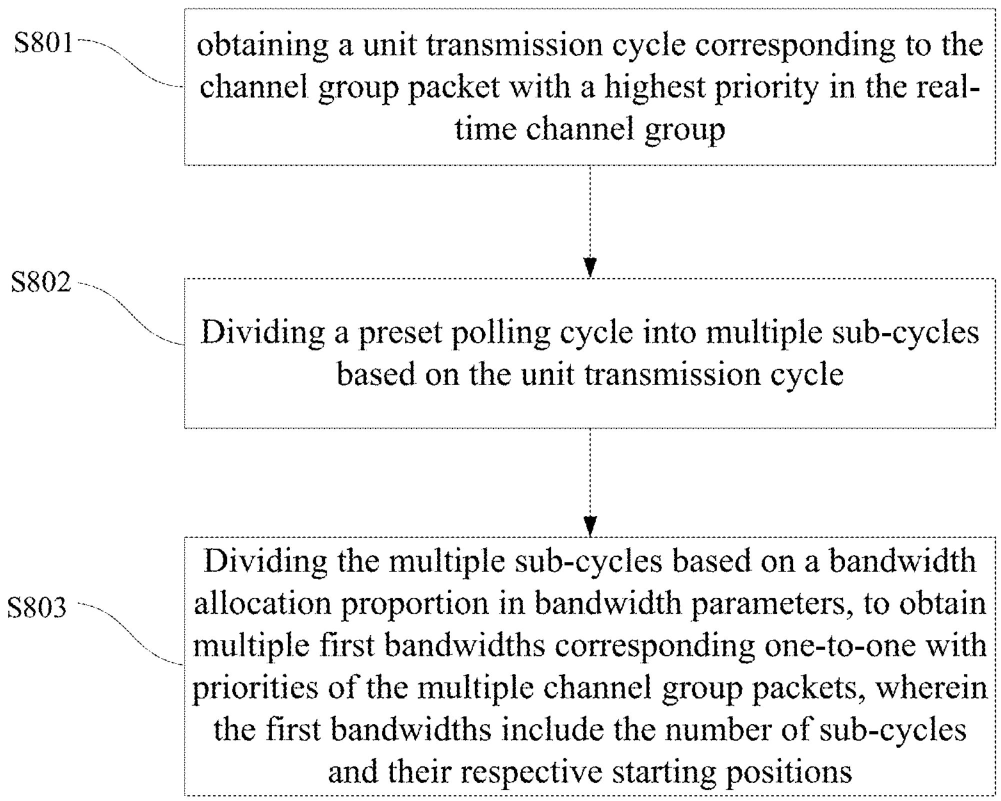
FIG. 8 is a flowchart illustrating the process of setting bandwidth priority for the real-time channel group provided in an embodiment of the present application.

Understandably, referring to FIG. 8, the method further includes performing the bandwidth allocation based on the bandwidth parameters, including:

- S801, obtaining a unit transmission cycle corresponding to the channel group packet with a highest priority in the real-time channel group;
- S802, dividing a preset polling cycle into multiple sub-cycles based on the unit transmission cycle.
- S803, dividing the multiple sub-cycles based on a bandwidth allocation proportion in bandwidth parameters, to obtain multiple first bandwidths corresponding one-to-one with priorities of the multiple channel group packets. The first bandwidths include the number of sub-cycles and their respective starting positions.

For example, assuming the unit transmission cycle is t1, the polling cycle is T, and the number of sub-cycles is T/t1, and if the bandwidth parameters specify 2 sub-cycles for the channel group packet with the highest priority and 1 sub-cycle for others, then the first 2 sub-cycles of the polling cycle are allocated to the channel group packets with the highest priority, and other sub-cycles are allocated in turns based on the priorities.

It should be noted that, the channel group packet with the highest priority includes a time-triggered channel group packet.

Understandably, the method according to the embodiment of the present application further includes assessing the availability of each first bandwidth before scheduling it in each polling cycle, and preemptively occupying the first bandwidth in available based on the length of the first bandwidth and the priority of pending channel group packets.

It should be noted that, the availability of each first bandwidth is dynamically assessed in each polling cycle, thereby improving the flexibility of the bandwidth usage, and enhancing bandwidth utilization. Exemplarily, the polling cycle is divided into the first bandwidth 1, the second bandwidth 2, and the third bandwidth 3. When the first bandwidth 1 is executed and no packet corresponding to the first bandwidth 1 is available, the system selects an available bandwidth based on the priorities of the second bandwidth 2 and the third bandwidth 3, and their respective packet length in the channel group. If the packet length corresponding to the second bandwidth 2 is too long to be transmitted in the first bandwidth 1, the third bandwidth 3 with the required packet length will be occupied. If both packet lengths corresponding to the second bandwidth 2 and the third bandwidth 3 are suitable for transmission in the first bandwidth 1, the preferred second bandwidth 2 with higher priority will be occupied. It should be noted that, if a channel group packet with the highest priority is generated within the scheduling time of the first bandwidth 1, the occupied packet transmission will be halted and the channel group packet with the highest priority will be processed preferentially.

Understandably, the method according to the embodiment of the present application further includes calculating the number of packets transmitted within a polling cycle based on the first bandwidth corresponding to the channel group packet with the highest priority, and displaying the number of packets.

It should be noted that by displaying the number of the channel group packets with the highest priority, users can be prompted to the frequency of triggering commands for these channel group packets. Exemplarily, in the embodiment shown in FIG. 1, node B is as the master node of the real-time channel group G1, which can process two real-time packets within time T1. That is to say, delays may occur if more than two real-time packets are processed with time T1. Preferably, the channel group packets with the highest priority may be triggered by key presses. That is, users can control the frequency of the key presses upon any prompts.

Understandably, before carrying out the bandwidth allocation based on the bandwidth parameters, the method according to the embodiment of the present application further includes obtaining bandwidth allocation parameters from the master node of the first network domain, where the first network domain includes at least one real-time channel group; or obtaining bandwidth allocation parameters set by the master node of at least one real-time channel group.

It should be noted that the master node of the first network domain carries out the unified allocation when the first network domain includes multiple real-time channel groups, thereby further ensuring the real-time transmission of the channel group packet with the highest priority.

It should be noted that in practical applications, the master node of the real-time channel group may choose whether to trigger the unified allocation by the master node of the first network domain.

It should be noted that in some embodiments where there is no interaction between multiple real-time channel groups, the master node of the real-time channel group can calculate the bandwidth allocation parameters and allocate them to the member nodes within the same real-time channel group.

It should be noted that, the bandwidth allocation parameters are configured by the master node of the real-time channel group and the master node of the first network domain based on the number of channel group packets with the highest priority that can be generated at the same time. For example, if multiple slave nodes in the real-time channel group are triggered at the same time, and the channel group packet from each triggered slave node passes through the member nodes in the channel group, the master node of the real-time channel group and the master node of the first network domain allocate more sub-cycles to the channel group packets with the highest priority, based on path planning.

Understandably, the method according to the embodiment of the present application further includes sending a bandwidth configuration request to the master node of the first network domain, wherein the bandwidth configuration request is used to request the master node of the first network domain to calculate the bandwidth allocation proportion based on an unexpected event generated by each member node of the real-time channel group.

It should be noted that in some embodiments, each member node in the real-time channel group may actively request the master node of the first network domain to perform a unified bandwidth allocation. For example, if the interaction modes between the member nodes in the real-time channel group involve sending, by the slave nodes, the channel group packets to the master node, each member node can initiate a request for unified bandwidth allocation to the master node of the first network domain based on the interaction modes.

Based on the same inventive concept as the aforementioned control method for the real-time channel group, the embodiment of the present application further provides an electronic device. The electronic device may specifically be an internal control device or system within a smart device, or an external device communicating with a smart device, such as a desktop computer, a laptop, a smartphone, a tablet PC, a personal digital assistant (PDA), a server, etc.

It should be noted that the electronic device according to the embodiment of the present application may be applied to any node within the network system shown in FIG. 1. The electronic device in this embodiment has the same inventive concept as the method of creating the real-time channel group shown in FIG. 2, which has similar principles of realization and technical effects, thus the detailed description is omitted here.

Persons skilled in the art can understand that the whole or partial steps of implementing the above embodiments can be accomplished through hardware related to program commands. The programs can be stored on a computer-readable storage medium and when executed, performs the steps described in the embodiments. The computer-readable storage medium can be any medium or data storage device accessible by a computer, including but not limited to various mediums capable of storing program codes, such as mobile storage devices, random access memory (RAM), magnetic storage (e.g., floppy disks, hard disks, magnetic tapes, magneto-optical disks (MO)), optical storage (e.g., CD, DVD, BD, HVD), and semiconductor memory (e.g., ROM, EPROM, EEPROM, NAND FLASH, SSD) etc.

Alternatively, if the functions are implemented in the form of software functional modules and for sale or use as independent products, they can be stored in a computer readable storage medium. Based on this, the technical solutions of the present application essentially or part of the present application contributing to the prior arts or part of the technical solutions can be embodied in the form of software products. The computer software products are stored in a storage medium and includes a number of commands for enabling a computer device (such as personal computer, server and network device) to execute all or part of the methods described in the embodiments. The aforementioned storage medium may include various mediums capable of storing program codes, such as mobile storage devices, random access memory (RAM), magnetic storage (e.g., floppy disks, hard disks, magnetic tapes, magneto-optical disks (MO)), optical storage (e.g., CD, DVD, BD, HVD), and semiconductor memory (e.g., ROM, EPROM, EEPROM, NAND FLASH, SSD), etc.

The above embodiments are provided for a detailed description of the technical solution of the present application, but the description of these embodiments is only for facilitating understanding of the methods disclosed herein and should not be construed as limitations on the embodiments of the present application. Variations or replacements readily apparent to those skilled in the art in this technical field should be encompassed within the protection scope of the present application.

What is claimed is:

1. A control method for a real-time channel group, comprising:

after a first real-time channel group creation request is received, joining any node in a network domain to a first real-time channel group, and initiating a system clock synchronization to nodes in the first real-time channel group, such that the nodes in the first real-time channel group use a same system clock;

after a second real-time channel group creation request is received, joining any node in the first real-time channel group as a shared node to a second real-time channel group;

determining, by the nodes in each real-time channel group, a number of interruptions based on an execution cycle and an interruption duration of each real-time channel group, and triggering a channel group packet parsing request of each real-time channel group based on the number of interruptions corresponding to each real-time channel group, wherein the channel group packet parsing request is configured to extract a channel group packet of the real-time channel group for parsing processing.

2. The method according to claim 1, further comprising:

determining a node in the real-time channel group as a master node for dominating a transmission of the channel group packet, and other nodes as slave nodes; wherein the master node is determined by either pre-designating by user or autonomously electing in all nodes in the real-time channel group.

3. The method according to claim 1, wherein for any real-time channel group within the network domain, a node not belonging to the any real-time channel group serve as a transparent transmission node, and the transparent transmission node is configured to transparently transmitting the channel group packet initiated by a member node of the any real-time channel group.

4. The method according to claim 2, wherein a step of autonomously electing the master node comprises:

sending, by each node within the real-time channel group, an election packet to other nodes within the real-time channel group, assessing a transmission efficiency of each node sending the election packet, and determining a node with a highest transmission efficiency as the master node, with other nodes as the slave nodes within the real-time channel group.

5. The method according to claim 4, wherein the transmission efficiency comprises at least one of:

a total forwarding count for the election packet reaching other nodes; and a number of the transparent transmission node passed during transmission of the election packet, wherein the transparent transmission node is located within the network domain but beyond the real-time channel group.

6. The method according to claim 4, further comprising:

before the election packet is sent by each node within the real-time channel group, determining an election transmission path by performing a shortest path planning for transmitting the election packet based on a routing table, with an originating node of the election transmission path as a source address of the election packet and an terminal node as a destination address.

7. The method according to claim 4, further comprising:

receiving, by each node within the real-time channel group, a topology update command, and reinitiating another election packet to other nodes within the real-time channel group to determine a new master node; wherein the topology update command is configured to request a re-election for the master node.

8. The method according to claim 2, wherein the master node of the real-time channel group is configured to process signal commands in the real-time channel group, comprising:

performing a shortest path planning on several slave nodes by using a routing table of the master node, and obtaining a first transmission path including the several slave nodes;

determining an terminal node of the first transmission path as a destination address for each signal command, and the master node as a source address of the signal command;

obtaining a first transmission duration for the signal command to reach the terminal node; and determining a first sending time period of the signal command based on an execution cycle of the signal command and the first transmission duration, such that the several slave nodes receive the signal command before an execution interruption within a same execution cycle is generated.

9. The method according to claim 8, wherein said obtaining a first transmission duration for the signal command to reach the terminal node comprises:

obtaining a packet length corresponding to a longest signal command;

calculating a resident clock cycle consumed on several slave nodes and a hardware transmission delay; and calculating the first transmission duration based on the packet length, the resident clock cycles, and the hardware transmission delay.

10. The method according to claim 9, wherein said obtaining a first transmission duration for the signal command to reach the terminal node further comprises:

obtaining an inter-frame space between two adjacent signal commands and a first reservation duration; and calculating the first transmission duration based on the packet length, the resident clock cycle, the hardware transmission delay, the inter-frame space, and the first reservation duration.

11. The method according to claim 8, wherein before determining the first sending time period of the signal command, the master node is further configured to obtain a cycle time of generating a unit interrupt, and determine the execution cycle based on a number of interrupts corresponding to the signal command.

12. The method according to claim 8, wherein the master node is located within multiple real-time channel groups, and each of which corresponds to a first sending time period.

13. The method according to claim 1, further comprising:

obtaining a unit transmission cycle corresponding to the channel group packet with a highest priority in the real-time channel group;

dividing a preset polling cycle into multiple sub-cycles based on the unit transmission cycle; and dividing the multiple sub-cycles based on a bandwidth allocation proportion in bandwidth parameters, to obtain multiple first bandwidths corresponding one-to-one with priorities of the multiple channel group packets, wherein each first bandwidth includes a number of sub-cycles and their respective starting positions.

14. The method according to claim 13, further comprising:

before scheduling each first bandwidth in each polling cycle, determining whether the first bandwidth is idle; and preemptively occupying the first bandwidth that is idle based on a bandwidth length of the first bandwidth and a priority of a pending channel group packet.

15. A network system, comprising multiple nodes, each of which is configured to execute the method according to claim 1.

16. A computer-readable storage medium, on which computer program commands are stored, wherein the computer program commands are executed by a processor to implement steps of the method according to claim 1.

* * * * *